(12) United States Patent
Cardin

(10) Patent No.: US 11,435,326 B2
(45) Date of Patent: Sep. 6, 2022

(54) RECOVERY OF ORGANIC COMPOUNDS IN LIQUID SAMPLES USING FULL EVAPORATIVE VACUUM EXTRACTION, THERMAL DESORPTION, AND GCMS ANALYSIS

(71) Applicant: Entech Instruments Inc., Simi Valley, CA (US)

(72) Inventor: Daniel B. Cardin, Simi Valley, CA (US)

(73) Assignee: Entech Instruments Inc., Simi Valley, CA (US)

( * ) Notice: Subject to any disclaimer, the term of this patent is extended or adjusted under 35 U.S.C. 154(b) by 280 days.

(21) Appl. No.: 16/892,125

(22) Filed: Jun. 3, 2020

(65) Prior Publication Data

US 2020/0378928 A1    Dec. 3, 2020

Related U.S. Application Data

(60) Provisional application No. 62/856,587, filed on Jun. 3, 2019.

(51) Int. Cl.
    *G01N 30/14*      (2006.01)
    *G01N 1/14*      (2006.01)
    (Continued)

(52) U.S. Cl.
    CPC ............... *G01N 30/14* (2013.01); *G01N 1/14* (2013.01); *G01N 1/2214* (2013.01);
    (Continued)

(58) Field of Classification Search
    CPC ........ G01N 30/14; G01N 1/14; G01N 1/2214; G01N 30/7206; G01N 2030/009;
    (Continued)

(56) References Cited

U.S. PATENT DOCUMENTS

| | | |
|---|---|---|
| 5,266,496 A | 11/1993 | Dacruz |
| 5,496,741 A | 3/1996 | Pawliszyn |

(Continued)

FOREIGN PATENT DOCUMENTS

| | | |
|---|---|---|
| EP | 1275438 A2 | 1/2003 |
| EP | 1275438 A3 | 3/2003 |

OTHER PUBLICATIONS

International Search Report received for PCT Patent Application No. PCT/US2018/038560, dated Sep. 26, 2018, 3 pages.

(Continued)

*Primary Examiner* — Jennifer Wecker
*Assistant Examiner* — Michael Paul Shimek
(74) *Attorney, Agent, or Firm* — Kubota & Basol LLP

(57) ABSTRACT

While sample extraction device including a sorbent is coupled to a sample vial containing a sample, a vacuum is drawn through the sample extraction device to evaporate the volatile matrix of the sample and carry volatilized target compounds of the sample to the sorbent. Optionally, once the volatile matrix is evaporated, the sample vial is heated and/or the vacuum level is increased to transfer heavier target compounds to the sorbent. Multiple sampling devices can be extracted in parallel. The sample extraction device can be inserted into a thermal desorption device that directly couples the sample extraction device to a gas chromatograph. In some embodiments, the sample is desorbed and analyzed using gas chromatography or another suitable technique. The techniques disclosed herein are used for analysis of volatile organic compounds and semi-volatile organic compounds in water, food, beverages, soils, and other matrices.

16 Claims, 8 Drawing Sheets

(51) Int. Cl.
   *G01N 1/22*    (2006.01)
   *G01N 30/72*   (2006.01)
   *G01N 30/00*   (2006.01)

(52) U.S. Cl.
   CPC ... *G01N 30/7206* (2013.01); *G01N 2030/009* (2013.01); *G01N 2030/143* (2013.01)

(58) Field of Classification Search
   CPC ....... G01N 2030/143; G01N 2030/085; G01N 2030/128; G01N 1/405
   See application file for complete search history.

(56)         References Cited

U.S. PATENT DOCUMENTS

| | | |
|---|---|---|
| 5,964,043 A | 10/1999 | Oughton et al. |
| 6,286,375 B1 | 9/2001 | Ward |
| 7,101,509 B2 | 9/2006 | Chang et al. |
| 7,955,864 B2 | 6/2011 | Cox et al. |
| 8,955,399 B2 | 2/2015 | Kanipayor et al. |
| 9,939,170 B2 | 4/2018 | Beer et al. |
| 2004/0126890 A1 | 7/2004 | Gjerde et al. |
| 2006/0269641 A1 | 11/2006 | Atwood et al. |
| 2010/0112683 A2 | 5/2010 | Atwood et al. |
| 2017/0023533 A1 | 1/2017 | Ghiasvand et al. |
| 2017/0303900 A1* | 10/2017 | Cardin .................. A61B 10/00 |
| 2018/0372599 A1 | 12/2018 | Cardin |

OTHER PUBLICATIONS

Non-Final Office Action received for U.S. Appl. No. 16/013,314, dated Apr. 9, 2020, 10 pages.

* cited by examiner

RECOVERY OF ORGANIC COMPOUNDS IN LIQUID SAMPLES USING FULL EVAPORATIVE VACUUM EXTRACTION, THERMAL DESORPTION, AND GCMS ANALYSIS

CROSS-REFERENCE TO RELATED APPLICATION

This application claims the benefit of U.S. Provisional Patent Application No. 62/856,587, filed on Jun. 3, 2019, the entire disclosure of which is incorporated herein by reference in its entirety for all purposes.

FIELD OF THE DISCLOSURE

This disclosure relates to extraction of a sample for further chemical analysis and, more particularly, to a system and method for preparing a sample for chemical analysis using evaporative vacuum extraction.

BACKGROUND OF THE DISCLOSURE

GCMS (Gas Chromatography/Mass Spectrometry) is a very powerful technique that can analyze for tens of thousands of different compounds in simple to complex matrices. However, for accurate detection and measurement, real world samples typically have to go through a clean up, simplification, and/or concentration process to allow the best possible accuracy and sensitivity for this technique. Foods, environmental samples such as water and soils, natural products, consumer products, biological/clinical samples, and a large number of other sample types may not simply be injected into the GCMS analyzer, as this can destroy the column, and can create thermal decomposition products (artifacts) that appear in the results that were not in the original sample. In many cases, high concentrations of certain matrix chemicals such as water, alcohol, or other light solvents, must be reduced or eliminated to achieve the desired detection limits, and to prevent overloading of the GCMS analyzer and signal suppression within the GCMS analyzer.

In many situations, liquid samples to be analyzed by GCMS contain matrix components such as non-volatile chemicals that may not be compatible with GCMS analyzers and must be separated from the GC compatible compounds prior to analysis. In other cases, compounds must be concentrated by eliminating the bulk components of the sample (often water, light alcohols, others) which could otherwise overwhelm the GCMS analyzer, affecting the sensitivity and overall analyzer performance. Foods, environmental samples, such as water and soil, natural products, consumer products, and a large number of other materials may not simply be injected into a GCMS without prior sample preparation, as this could destroy the GC column, and could create new thermal decomposition products (artifacts) that were not in the original sample.

There are several techniques that can be used to extract compounds out of these sample matrices to allow measurement of the GCMS compatible fraction. Liquid-liquid or liquid-solid extractions using an extraction solvent such as Methylene Chloride using either a separatory funnel (liquid/liquid), or a Soxhlet Extraction apparatus (liquid/solid) have been in use the longest and perhaps are listed in more analytical methods for initial sample preparation prior to GCMS analysis than any other extraction technique. Unfortunately, solvent extraction has a lot of limitations, including incomplete recovery of both polar and non-polar analytes of interest, the undesirable co-extraction of compounds which are too heavy for a GCMS (lipids, waxes, mineral oils, etc), and will often co-extract too much of the unwanted matrix, such as water and minerals. During the solvent elimination stage after extraction, too many light end compounds of interest are also lost during the evaporation of the solvent. Although labs used to be able to send solvent vapors out through a hood and into the outside air, this is generally no longer allowed or acceptable practice. In general, the analytical community as a whole are looking for "greener" techniques that eliminate solvents altogether, both because of their effects on the environment, and because of toxic effects they have on Chemists who are exposed to them day after day. Finally, evaporating the solvent down to levels of less than 1 cc (1000 microliters) is generally avoided to prevent too much loss of target analytes, yet GCs are generally limited to just a 1 microliter injection volume due to the rapid expansion of 1 microliter of solvent liquid to about 1 cc of solvent vapor, which is the volume limit of a GC injector delivery system. Therefore, injection of just 1 microliter out of 1000 microliters of the final extract results in a 1000:1 dilution, and a subsequent reduction in analytical sensitivity.

Other techniques such as SBSE and full emersion SPME try to replace a solvent by immersing a polymer coated device into a sample to extract GCMS compatible compounds, followed by a rinsing and thermal desorption into the GCMS. Unfortunately, these techniques are generally phase limited, and do not recover compounds that are highly soluble in the sample matrix. They also suffer from partial absorption of non-volatile compounds resulting in artifact formation during thermal desorption, which not only introduces chemicals into the GCMS analyzer that were not present in the original sample, but also cause the degradation of the extraction device, limiting the number of samples it can process. These full immersion devices typically also produce a lot of bleed from the extraction polymer which can require frequent cleaning of the analyzer, and the thick polymeric layers used for these extractions often require long bakeout times to fully eliminate the remaining sample components before processing the next sample.

Headspace analysis has become a popular class of sample extraction and preparation techniques due to its ability to avoid direct contact with the sample, thereby eliminating the potential for interferences from non-volatile chemicals. Non-volatile compounds may remain in the vial, including carbohydrates, tryglycerides and other lipids, proteins, biological compounds, particulates and non-soluble materials, and most ionized species. However, the inability for headspace methods to recover the less volatile but still GC compatible compounds has been a limitation of some headspace extraction techniques (e.g., SPME, SPME ARROW, DHS, Purge & Trap, Loop Injection). These headspace extraction techniques typically attempt to extract the compounds of interest out of the matrix while leaving the matrix and unwanted non-volatile compounds behind, but heavier compounds of interest and those compounds that are highly soluble in the matrix are often poorly extracted. Some other techniques purge a gas through the vial, either into the headspace only, or through the liquid sample, requiring the trapping of the sample in a sorbent outside of the vial. Those techniques require large purge volumes, which can cause many compounds of interest to break through the sorbent, while causing other compounds to be pushed further into the sorbent thereby reducing recovery during thermal desorption, decreasing the sensitivity and accuracy of the analysis, and leading to increased carryover due to residual chemicals deep within the sorbent that remains during the next sample analysis.

Some sample preparation methods use vacuum distillation, such as US EPA Methods 1624 and 8261, to extract compounds of interest with final collection into a liquid nitrogen cooled trap. However, these methods recover large amounts of water vapor, thereby still presenting an analytical challenge for analysis without injecting too much water into the GCMS. The use of transfer lines, rotary valves, and other apparatus in the flow path prior to the trap also reduce the extraction efficiency, due to added surface exposure, dead volume found in connective fittings, and the poor transmission of vacuum through long lengths of tubing and numerous low volume connective fittings.

Therefore, there is a need for a sample preparation solution prior to GCMS analysis that consistently extracts and isolates all compounds of interest, while eliminating compounds that are too heavy for GCMS analysis (too nonvolatile), compounds that can decompose during thermal desorption, and compounds that are in too high of an abundance that would overwhelm the GCMS analyzer (water, alcohols, and solvents). In addition, the extraction technique should be green, requiring zero or minimal toxic solvents, and should desorb the entire extracted sample into the GCMS analyzer, not just a fraction of it, in order to maximize method sensitivity. The extraction technique also should allow the recovery of light to heavy compounds, at least within a range of compounds that can be handled by a specific type of GC column. Thin film GC columns are generally used for heavier compounds analysis, often referred to as semi-volatile organic compounds (SVOCs), while thicker film columns are used to analyze lower boiling compounds, referred to as volatile organic compounds (VOCs). Therefore, the extraction technique needs to at least recover all compounds of interest that can be handled by either a thin film GC column (SVOCs), or those optimized using a thicker film GC column (VOCs).

SUMMARY OF THE DISCLOSURE

This disclosure relates to extraction of a sample for further chemical analysis and, more particularly, to a system and method for preparing a sample for chemical analysis using evaporative vacuum extraction. The techniques presented in this disclosure optimize the analysis of compounds in the SVOC range, and allows recovery of a larger range of polar and non-polar SVOC compounds than any other sample preparation technique presented to date, either without the use of any solvents during the sample extraction/sample preparation process when analyzing liquid samples, or using minimal amounts of non-toxic solvents (e.g., alcohols, water and alcohol) when analyzing solid samples. Systems and methods disclosed herein improve the range of volatile and semi-volatile compounds recoverable from liquid samples for subsequent analysis by Gas Chromatography/Mass Spectrometry. The extraction is performed without touching the sample by placing a sample extraction device containing a sorbent (adsorbent or absorbent) in close proximity to the sample to be extracted. In this way, the volatilized sample can be more completely directed to the collection sorbent compared to the performance of other headspace techniques.

The disclosed sample extraction device contains a sorbent. While the sample extraction device is coupled to a sample container (e.g., a sample vial) containing a sample, a vacuum is drawn through the sample extraction device to evaporate the matrix of the sample and carry volatilized target compounds of the sample to the sorbent. Optionally, once the sample matrix is evaporated, the sample vial is heated to transfer heavier target compounds to the sorbent. The sample extraction device can be inserted into a thermal desorption device that directly couples the sample extraction device to a gas chromatograph. In some embodiments, the sample is desorbed and analyzed using gas chromatography or another suitable technique.

The disclosed system performs a full evaporation of a sample through a sorbent material to eliminate the main matrix components such as water and alcohol, while retaining the compounds of interest (heavy VOCs and SVOCs). The extraction can be performed at low temperatures (e.g., 20-40 degrees Celsius) to reduce the rate of flow of water or solvent vapors through the sorbent, thereby reducing the channeling of target compounds of interest into the sorbent, which would reduce their recovery during subsequent thermal desorption. The low temperature evaporation allows the sorbent to be maintained at a relatively low temperature, and typically 5-20 degrees Celsius higher than the sample during evaporation. This ensures that the water or solvent will remain in the gas phase during the extraction through the sorbent, while also maximizing the recovery of lighter compounds that would otherwise breakthrough the sorbent at higher temperatures. Therefore, a vacuum is used to evaporate the matrix through the sorbent, and the vacuum is controlled such that boiling of the water or solvent will not occur, but is just strong enough to complete the evacuation in a reasonable period of time. After the water or solvent has been completely evaporated through the sorbent, the sample container (e.g., a sample vial) can be heated to a temperature much higher than the sorbent in order to volatilize much heavier compound of interest. During this second stage of extraction, compounds are no longer "dynamically" transferred to the sorbent via an evaporating water/solvent gas stream, but are allowed to simply diffuse under a relatively strong vacuum to the sorbent bed. A zero carrier gas flow in this case completely eliminates the potential for channeling (e.g., carrier gas-induced ingress into the sorbent), allowing the heavier components of the sample to deposit optimally close to the very front of the sorbent bed, thereby both improving their recovery during thermal desorption, while also reducing the potential for carryover (e.g., persistence of compounds from the prior sample extraction) into subsequent analyses.

During the extraction process, the liquid sample is placed in a vial. The volume of the vial is in the range of 1-20 cc or 2-8 cc, for example, or another volume. For example, lcc of sample can be deposited into a 2 cc sample vial for extraction according to the techniques disclosed herein. Extracting 1 cc of sample using the techniques disclosed herein can produce sensitivity equal to the sensitivity achieved by performing a solvent extraction of 1 liter of sample, where only 1 microliter of the final 1000 microliter solvent extract is injected into the chemical analysis system. As another example, the sample vial can have a volume of 10 cc. The sample extraction device including the sorbent is positioned at the top of the vial such that it makes a vacuum tight seal. A vacuum is applied to the vial through the sorbent that slowly volatilizes compounds such as water, ethanol, or other light matrix components in such a way that the gas phase matrix (water, ethanol, other) is able to sweep one or more organic compounds into the sorbent. In this way, the gas phase matrix from the sample itself can act as a carrier fluid without the addition of another carrier gas that would only service to cause target compounds to break through the sorbent extraction/collection device prior to removal of the volatile sample matrix. That is, rather than flowing about 400 cc of water vapor resulting from the vaporization and elimination of 1 cc liquid water from a vial, using purified Nitrogen or Helium may require 5-10 liters of gas to flow through the sorbent to eliminate the entire volatile matrix (1 cc of water, for example), and this additional volume of purge gas would cause many more compounds to break through the sorbent, and many heavier compounds to be pushed further into the sorbent where recoveries would be worse. The sorbent is chosen such that the matrix (water, alcohol, other) has very little affinity to the sorbent, allowing the gas phase volatile matrix to easily pass through the sorbent as it flows to the vacuum system. In some embodiments, after the matrix is completely evaporated and eliminated through the sorbent, the sample vial can be heated while still under vacuum to drive the higher boiling point compounds into the gas phase to continue their transfer into the sorbent. In some embodiments, in the case of natural products where such heat may denature or break down the sample to create artifacts, the final heating stage can be eliminated, or less excessive temperature increases can be used during the second stage (e.g., 50-100 degrees Celsius) to improve the recovery of some compounds without reaching the thermal decomposition temperature of other. Depending on the matrix, embodiments without final heating can efficiently recover compounds with boiling points beyond 400 degrees Celsius. Embodiments with final heating can recover compounds with boiling points beyond 550 degrees Celsius, such as when performing trace level water analysis.

In general, the ability to extract the sample under a relatively strong vacuum ($1/30^{th}$ of atmospheric pressure for water at 25 degrees Celsius, for example) allows higher boiling point compounds to be recovered at lower temperatures, thereby reducing the stress on both thermally labile compounds of interest, and reducing thermal degradation of non-volatile compounds in the sample. In addition, once the volatile matrix has been removed using a controlled vacuum and sample temperature, an even stronger vacuum can be applied during a second transfer stage, whether the sample vial is heated higher or not, as the higher vacuum itself can improve the efficiency of heavy compound transfer without applying as much heat, again reducing the potential for thermal degradation. In some embodiments, the final heating of the vial while under a weak to strong vacuum can be adjusted from any temperature between ambient (e.g., 20 to 30 degrees Celsius) to 300 degrees Celsius, where ambient to 50-100 C may be used for food, beverages, or biological samples that may degrade at higher temperatures. In many cases, while under a vacuum, temperatures as low as 200 degrees Celsius can allow recovery of 6 ring Polyaromatic Hydrocarbons (PAHs) that boil at 550 degrees Celsius at atmospheric pressure, showing that extraction under vacuum, with the sorbent in close proximity to the sample matrix, can allow recovery of a very large range of VOC to SVOC compounds with very little thermal stress on the sample matrix.

DETAILED DESCRIPTION

Figure 1A:
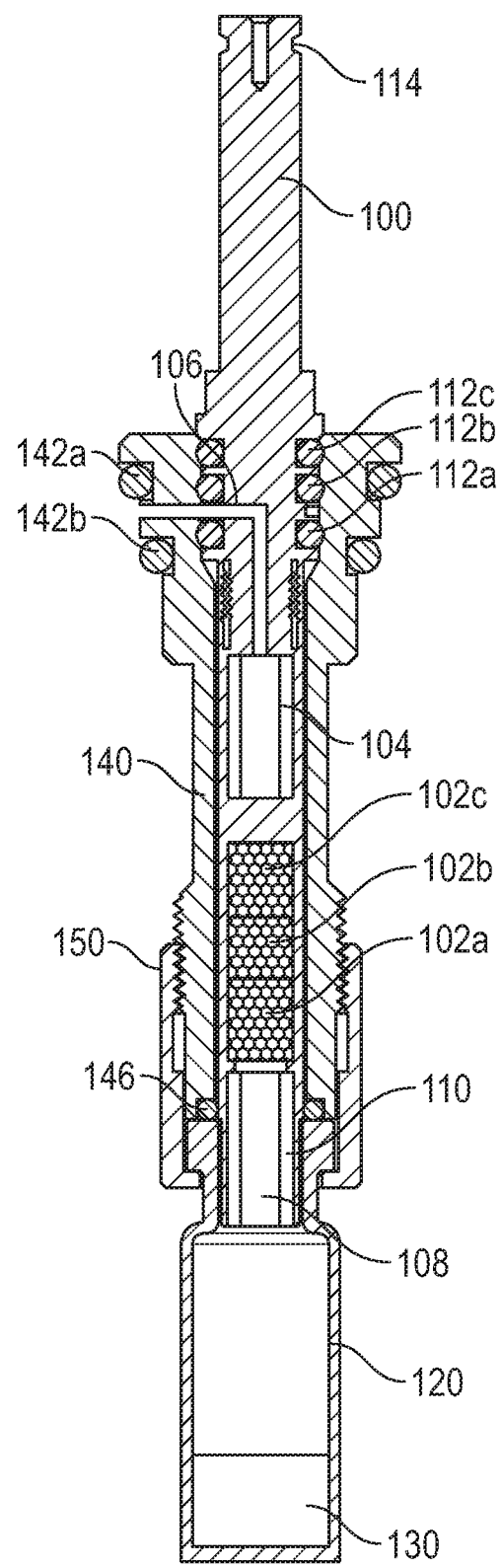
FIGS. 1A-1C illustrate an exemplary sample extraction device according to some embodiments.

In the following description, reference is made to the accompanying drawings which form a part hereof, and in which it is shown by way of illustration specific examples that can be practiced. These examples should be understood to be non-limiting. It is to be understood that other examples can be used and structural changes can be made without departing from the scope of the examples of the disclosure.

This disclosure relates to extraction of a sample for further chemical analysis and, more particularly, to a system and method for preparing a sample for chemical analysis using evaporative vacuum extraction. The techniques presented in this disclosure optimize the analysis of compounds in the SVOC range, and allows recovery of a larger range of polar and non-polar SVOC compounds than any other sample preparation technique presented to date, either without the use of any solvents during the sample extraction/sample preparation process when analyzing liquid samples, or using minimal amounts of non-toxic solvents (e.g., alcohols, water and alcohol) when analyzing solid samples. Systems and methods disclosed herein improve the range of volatile and semi-volatile compounds recoverable from liquid samples for subsequent analysis by Gas Chromatography/Mass Spectrometry. The extraction is performed without touching the sample by placing a sample extraction device containing a sorbent (adsorbent or absorbent) in close proximity to the sample to be extracted. In this way, the volatilized sample can be more completely directed to the collection sorbent compared to the performance of other headspace techniques.

The disclosed sample extraction device contains a sorbent. While the sample extraction device is coupled to a sample container (e.g., a sample vial) containing a sample, a vacuum is drawn through the sample extraction device to evaporate the matrix of the sample and carry volatilized target compounds of the sample to the sorbent. Optionally, once the sample matrix is evaporated, the sample vial is heated to transfer heavier target compounds to the sorbent. The sample extraction device can be inserted into a thermal desorption device that directly couples the sample extraction device to a gas chromatograph. In some embodiments, the sample is desorbed and analyzed using gas chromatography or another suitable technique.

The disclosed system performs a full evaporation of a sample through a sorbent material to eliminate the main matrix components such as water and alcohol, while retaining the compounds of interest (heavy VOCs and SVOCs). The extraction can be performed at low temperatures (e.g., 20-40 degrees Celsius) to reduce the rate of flow of water or solvent vapors through the sorbent, thereby reducing the channeling of target compounds of interest into the sorbent, which would reduce their recovery during subsequent thermal desorption. The low temperature evaporation allows the sorbent to be maintained at a relatively low temperature, and typically 5-20 degrees Celsius higher than the sample during evaporation. This ensures that the water or solvent will remain in the gas phase during the extraction through the sorbent, while also maximizing the recovery of lighter compounds that would otherwise breakthrough the sorbent at higher temperatures. Therefore, a vacuum is used to evaporate the matrix through the sorbent, and the vacuum is controlled such that boiling of the water or solvent will not occur, but is just strong enough to complete the evacuation in a reasonable period of time. After the water or solvent has been completely evaporated through the sorbent, the sample container (e.g., a sample vial) can be heated to a temperature much higher than the sorbent in order to volatilize much heavier compound of interest. During this second stage of extraction, compounds are no longer "dynamically" transferred to the sorbent via an evaporating water/solvent gas stream, but are allowed to simply diffuse under a relatively strong vacuum to the sorbent bed. A zero carrier gas flow in this case completely eliminates the potential for channeling (e.g., carrier gas-induced ingress into the sorbent), allowing the heavier components of the sample to deposit optimally close to the very front of the sorbent bed, thereby both improving their recovery during thermal desorption, while also reducing the potential for carryover (e.g., persistence of compounds from the prior sample extraction) into subsequent analyses.

During the extraction process, the liquid sample is placed in a vial. The volume of the vial is in the range of 1-20 cc or 2-8 cc, for example, or another volume. For example, 1 cc of sample can be deposited into a 2 cc sample vial for extraction according to the techniques disclosed herein. Extracting 1 cc of sample using the techniques disclosed herein can produce sensitivity equal to the sensitivity achieved by performing a solvent extraction of 1 liter of sample, where only 1 microliter of the final 1000 microliter solvent extract is injected into the chemical analysis system. As another example, the sample vial can have a volume of 10 cc. The sample extraction device including the sorbent is positioned at the top of the vial such that it makes a vacuum tight seal. A vacuum is applied to the vial through the sorbent that slowly volatilizes compounds such as water, ethanol, or other light matrix components in such a way that the gas phase matrix (water, ethanol, other) is able to sweep one or more organic compounds into the sorbent. In this way, the gas phase matrix from the sample itself can act as a carrier fluid without the addition of another carrier gas that would only service to cause target compounds to break through the sorbent extraction/collection device prior to removal of the volatile sample matrix. That is, rather than flowing about 400 cc of water vapor resulting from the vaporization and elimination of 1 cc liquid water from a vial, using purified Nitrogen or Helium may require 5-10 liters of gas to flow through the sorbent to eliminate the entire volatile matrix (1 cc of water, for example), and this additional volume of purge gas would cause many more compounds to break through the sorbent, and many heavier compounds to be pushed further into the sorbent where recoveries would be worse. The sorbent is chosen such that the matrix (water, alcohol, other) has very little affinity to the sorbent, allowing the gas phase volatile matrix to easily pass through the sorbent as it flows to the vacuum system. In some embodiments, after the matrix is completely evaporated and eliminated through the sorbent, the sample vial can be heated while still under vacuum to drive the higher boiling point compounds into the gas phase to continue their transfer into the sorbent. In some embodiments, in the case of natural products where such heat may denature or break down the sample to create artifacts, the final heating stage can be eliminated, or less excessive temperature increases can be used during the second stage (e.g., 50-100 degrees Celsius) to improve the recovery of some compounds without reaching the thermal decomposition temperature of other. Depending on the matrix, embodiments without final heating can efficiently recover compounds with boiling points beyond 400 degrees Celsius. Embodiments with final heating can recover compounds with boiling points beyond 550 degrees Celsius, such as when performing trace level water analysis.

In general, the ability to extract the sample under a relatively strong vacuum ($1/30^{th}$ of atmospheric pressure for water at 25 degrees Celsius, for example) allows higher boiling point compounds to be recovered at lower temperatures, thereby reducing the stress on both thermally labile compounds of interest, and reducing thermal degradation of non-volatile compounds in the sample. In addition, once the volatile matrix has been removed using a controlled vacuum and sample temperature, an even stronger vacuum can be applied during a second transfer stage, whether the sample vial is heated higher or not, as the higher vacuum itself can improve the efficiency of heavy compound transfer without applying as much heat, again reducing the potential for thermal degradation. In some embodiments, the final heating of the vial while under a weak to strong vacuum can be adjusted from any temperature between ambient (e.g., 20 to 30 degrees Celsius) to 300 degrees Celsius, where ambient to 50-100 C may be used for food, beverages, or biological samples that may degrade at higher temperatures. In many cases, while under a vacuum, temperatures as low as 200 degrees Celsius can allow recovery of 6 ring Polyaromatic Hydrocarbons (PAHs) that boil at 550 degrees Celsius at atmospheric pressure, showing that extraction under vacuum, with the sorbent in close proximity to the sample matrix, can allow recovery of a very large range of VOC to SVOC compounds with very little thermal stress on the sample matrix.

The disclosed sample preparation system and method prepares a sample for measurement of trace level, GC compatible compounds in aqueous samples. In some embodiments, the sample can also contain alcohols such as Ethanol, or other volatile compounds that are not well retained on sorbents that can otherwise retain chemicals of interest in the sample. As used herein, "sorbent" is a general term to describe the media that performs either an absorption or adsorption of the sample, and sometimes sorbent and adsorbent are used interchangeably herein. A typical sample volume may be in the range of 50 Microliters to 5000 Microliters (0.05-5 cc), though in some embodiments, other sample volumes are possible. The disclosed sample preparation system and method allows for measurement of compounds down to the low part per trillion range using standard GCMS in full scan mode, or sub-part per trillion levels using Time of Flight, Orbitrap, FTMS, TSQ, or even single quad MS in Single Ion Monitoring Mode (SIM MODE). A simple dilution of the sample with water or the appropriate volatile solvent can allow analysis of higher concentration samples in the PPB and PPM range.

Figure 1B:
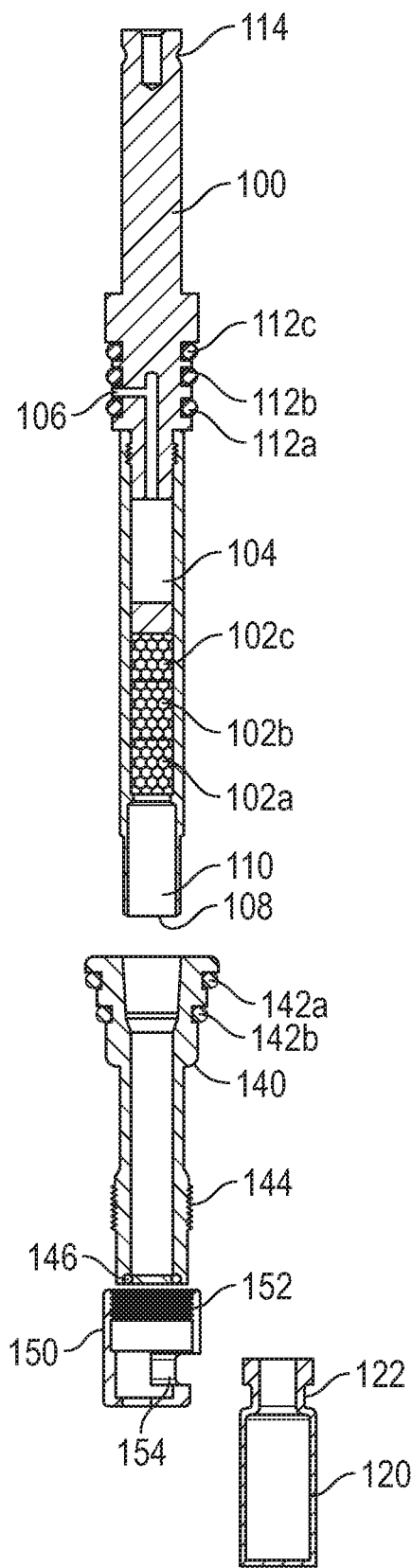
Figure 1C:
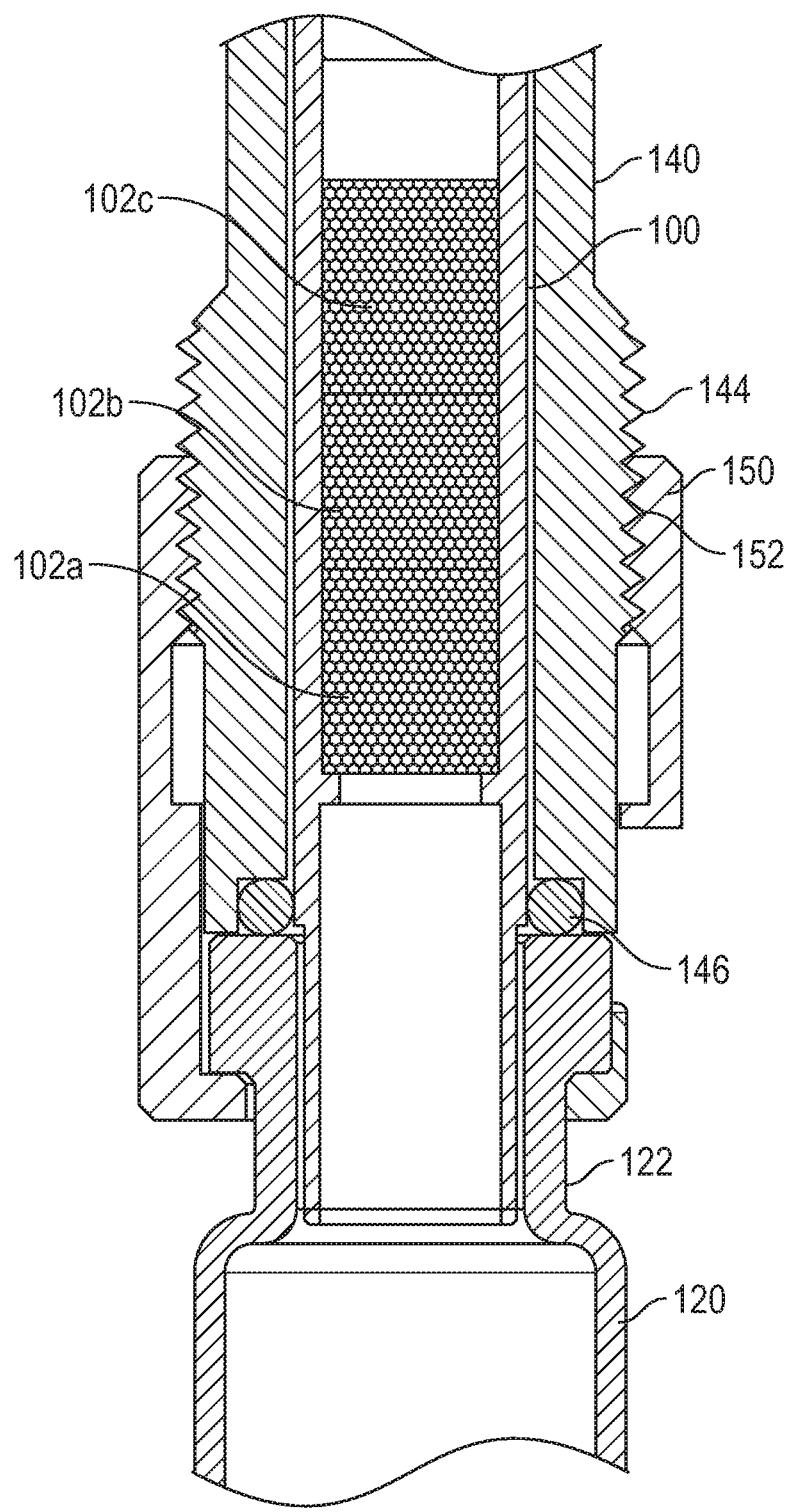

It should be appreciated that the techniques disclosed herein do not require the use of liquid nitrogen as a coolant. Eliminating the use of liquid Nitrogen eliminates the cost and safety concerns associated with liquid Nitrogen. Additionally, the techniques disclosed herein do not require the use of transfer lines (e.g., between the sample vial and the sample extraction device, between the sample extraction device and the gas chromatograph). Eliminating the use of transfer lines has advantages, as transfer lines can reduce transmission of heavy compounds, can catalyze the reaction of many labile compounds, can create variable transmission of target compounds based on the buildup or absence of very heavy extracted compounds (waxes, oils), and require additional fittings that create dead volume and cold spots both at the beginning and end of transfer lines. In this case, transfer lines can also reduce the transmission of a vacuum between the sample and the sorbent, reducing the efficiency of matrix elimination. The elimination of transfer lines eliminates all of these negative aspects, and the variability in analytical system performance that comes with them. As will be described in more detail below, the techniques disclosed herein include a dynamic vacuum extraction process that can be followed by a diffusive vacuum extraction process in some embodiments. As will be described in more detail below, the use of a diffusive vacuum extraction process can improve the recovery and desorption of heavier target compounds and reduce or eliminate contamination of the sample extraction device that would otherwise cause carryover of left over compounds into the next sample analysis. Diffusive sampling of the heaviest compounds will deposit them at the very front of the single or multi-sorbent bed, virtually eliminating channeling which can cause poor recovery and increased carryover. Generally, the first stage dynamic vacuum extraction process occurs at a lower temperature than the second stage diffusive vacuum extraction process in embodiments in which the diffusive process occurs. The use of a lower temperature during the dynamic vacuum extraction process can prevent boiling of the matrix and aerosolization of the matrix which would transfer unwanted non-volatile compounds including proteins, lipids, carbohydrates, and salts/minerals to the extraction device, creating thermal degradation products during thermal desorption and overall reducing the number of times the extraction device can be reused. As will be described in more detail below, the techniques disclosed herein are capable of completely evaporating the volatile constituents of the sample matrix, which for many samples is over 98% of the mass of the sample matrix, thereby allowing much more complete recovery of target compounds that are otherwise highly soluble in the volatile matrix. Such samples can include drinking water, ground water, wastewater, sea water, and samples obtained from a preliminary extraction of chemicals using a hot water or water/solvent mixture (water/EtOH for example) extraction of solid samples, such as for analysis of pesticides and other contaminants in foods, cannabis, and soils FIGS. 1A-1C illustrate an exemplary sample extraction device 100 according to some embodiments. Sample extraction device 100 can include sorbents 102a-c, port 106, and conveyances 104 and 110, seals 112a-c, and detent 114. In some embodiments, the sample extraction device 100 can be made from a strong and durable material such as stainless steel (e.g., 304 or 316 stainless), and may be coated with a ceramic material (e.g., Silonite) that further increases the inertness of surfaces exposed to chemicals, and especially thermally labile chemicals. A ceramic coating can be as inert as a GC column, allowing recovery all GC compatible compounds when exposed to such surfaces, either while these surfaces are cold during sample extraction, or hot during thermal desorption of the sample into a GC. In some embodiments, while in use to extract one or more compounds of interest from a sample, sample extraction device 100 is disposed within vacuum sleeve 140 and coupled to sample vial 120 (containing sample 130) via coupling 150. In some embodiments, as shown in FIGS. 1A-1C, the sample extraction device 100 can include three sorbents 102a, 102b, and 102c.

When the sample extraction device 100 is coupled to the sample vial 120, such as in shown in FIG. 1A, conveyance 110 fluidly couples the sample 130 to the sorbents 102a-c such that one or more compounds of interest can be retained by the sorbents 102a-c as described herein. Moreover, conveyance 110 can act as a first stage of condensation that is even weaker than sorbent 102a, allowing lower temperatures during thermal desorption to recover the heaviest compounds. Conveyance 110 can also help to thermally separate sorbent 102a (and sorbents 102b-c) from the heat of the sample vial 120 during the second stage, diffusive vacuum extraction during which the sample vial 120 is heated in some embodiments, as will be described in more detail below. Also, in some embodiments, conveyance 110 occupies almost the entire opening of the sample vial 120 to maximize exposure of sample 130 to the opening of the sorbent extraction device for maximum statistical recovery during both the first and second stage of extraction. Occupying nearly the entire opening of the sample vial 120 also minimizes exposure of the sample 130 to the sealing o-ring 146, thereby both reducing carryover potential, and also extraction of any native contaminants within the o-ring 146. Conveyance 104 fluidly couples the sorbents 102a-c to port 106, which allows a vacuum to be drawn through port 106 to produce a vacuum in the sample vial 120 as will be described in more detail herein. Conveyance 104 can provide thermal separation of the sorbents 102a-c from the sealing o-rings 112a-c during thermal desorption of the sample device 100 into a chemical analysis device (e.g., a GCMS) during analysis of the extract. In some embodiments, a glass rod is disposed in conveyance 104 to reduce the internal volume of the extraction device 100 while forcing the desorption gas to flow along the walls of conveyance 104 during thermal desorption, thereby improving the preheating of the desorption gas during GCMS analysis for faster and more complete release of the sample.

In some embodiments, only one sorbent (e.g., 102a or 102b or 102c) is used at the locations of 102a-c illustrated in FIGS. 1A-1B. In some embodiments, two sorbents (e.g., two of 102a, 102b, or 102c) is used at the locations of 102a-c in FIGS. 1A-1B. In some embodiments, more than three sorbents 102a-c are used (e.g., 4 or 5 or 6 or more sorbents). In some embodiments in which multiple sorbents 102a-c are used, the sorbents 102a-c are arranged in order of weakest to strongest, with the weakest sorbent 102a being closest to a bottom opening 108 of the sample extraction device and the strongest sorbent 102c being closest to port 106. In this way, the heaviest compounds of sample 130 can be retained by sorbent 102a without reaching the stronger sorbent 102b or the strongest sorbent 102c, thereby reducing or preventing contamination of sorbents 102b and 102c. In some embodiments, lighter compounds of interest unretained by sorbent 102a can be retained by sorbent 102b or sorbent 102c. In some embodiments, the sample extraction device 100 can have a reduced diameter at the bottom of sorbent 102a to retain a screen that retains the sorbent 102a. Screens can be placed between the different sorbents 102a, 102b, and 102c to maintain separation of the different sorbents 102a-c. In general, increasing the number of sorbent stages can increase the boiling point range of compounds that are recovered during the extraction, while in some cases the use of 1 or 2 sorbents is used intentionally to simplify the extracted sample to focus on a smaller subset of chemicals in the sample, to reduce the complexity of the sample to be injected into the GC. Specialty sorbents may even be used to selectively retain compounds of a specific family or having specific features or moieties.

In some embodiments, seals 112a-c can be o-ring seals disposed around the body of the sample extraction device 100. The seals 112a-c facilitate drawing and maintaining a vacuum in the sample vial 130 through the port 106 of the sample extraction device 100 during sample extraction. During sample analysis, the seals 112a-c seal the sample extraction device 100 while the sample is desorbed and analyzed, as will be described in more detail below (e.g., with reference to FIGS. 3-4).

In some embodiments, vacuum sleeve 140 includes seals 142a-b and 146, and threads 144, as shown in FIG. 1B. During sample extraction, seals 142a-b can seal against a vacuum tray to facilitate the drawing and maintaining of a vacuum in the sample vial 120. In some embodiments, seal 146 seals the location at which the bottom opening 108 of the sample extraction device 100 meets the top of the sample vial 120. Threads 144 (or another suitable coupling) can be used to couple the vacuum sleeve to coupling 150.

In some embodiments, coupling 150 includes threads 152 and opening 154. In some embodiments, coupling 150 includes a nut or other fitting that creates a vacuum tight seal between the extraction sleeve 140, extraction device 100, and vial 130, using o-ring 146. The coupling 150 can be used to couple the sample vial 120 to the sample extraction device 100 during sample extraction, to allow vacuum to be exerted through the extraction device 100 and into vial 120. In some embodiments, a vacuum source is maintained during extraction, allowing volatile matrix components (water, ethanol, other solvents) to be completely eliminated through port 106 and ultimately eliminated through the source of the vacuum (oil free pump, for example). In some embodiments, using a very small annular space between the extraction device 100 and the inside of the vial 120 can minimize sample (compound) exposure to this area that will be much cooler than the lower parts of the vial during the diffusive vacuum sampling stage where the vial can be heated to higher temperatures, thereby increasing the statistical probability that the heaviest compounds will be recovered "inside" of extraction device 100 where they can be successfully delivered to the GCMS during thermal desorption. Coupling 150 can allow the sample vial 120 and sample extraction device 100 to be directly coupled to one another without the use of an intervening transfer line.

This arrangement can allow the sample 130 to be within millimeters of the bottom end 108 of the sample collection device 100 to greatly increase recovery and precision of the technique. Eliminating the intervening transfer line is desirable because transfer lines can reduce the recovery of some compounds due to surface catalyzed reactions because transfer lines may have a reactive inner surface. Over time, heavy compounds (e.g., oils and waxes) can build up on the surface of transfer lines, thereby reducing recovery of compounds of interest, for example. Eliminating the use of transfer lines between the sample 130 and the sorbents 102a-c greatly increases the long term reliability of this approach, and therefore its viability as a means to produce reliable, quantitative results for both certified and non-certified methods, for example.

The sample vial 120 can be a crimp-top vial, allowing a shorter region within the vial where the temperature can transition from hot to cold, reducing the occurrence of an undesirable "cold-spot" within the extraction system where compounds of interest may be lost. With a crimp top vial, it is easier to quickly change the temperature of the vial 120 (e.g., from cold to hot), which is more difficult when using a screw threaded vial. Also, screw threaded vials generally use plastic caps that are not rated for high temperatures. In contrast, the combination of a crimp top vial, coupling 150, and o-ring 146 (e.g., o-ring can include FKM, Silicone, others) can allow heating of the sample vial 120 up to 300 degrees Celsius, while maintaining much cooler temperatures above the bottom 108 of extraction device 100. In addition, the extension of the bottom 108 of extraction device 100 down into the sample vial 120, below the thicker glass section of the crimp top section, and near the thinner walled section and higher temperature portion of the sample vial 120 can ensure the deposition of the heaviest compounds of interest inside of extraction device 100 during the second stage diffusive vacuum extraction.

The sample vial 120 can include glass or another suitable material that is inert and can withstand the temperatures applied to the sample vial 120 in the techniques described herein. In some embodiments, sample vial 120 includes detent 122 that facilitates coupling the sample vial to coupling 150 through opening 154. As shown in FIG. 1B, the glass walls of the sample vial 120 can be thicker above detent 122, thereby allowing the sample vial 120 to withstand strong clamping forces (e.g., by coupling 150) without damaging the vial 120. Opening 154 can allow the sample vial 120 to be loaded through the side of coupling 150, either before or after loosely coupling the coupling 150 to the vacuum sleeve 140, thereby allowing either an increase or decrease in the size of the sample vial 120 below the detent 122 to accommodate either larger or smaller sample volumes.

Sample vial can have a volume in the range of 1-20 milliliters, though other volumes are possible. In some embodiments, the volume of sample 130 is less than the full volume of the sample vial 120. For example, 10 milliliters of sample can be deposited into a 20 milliliter vial for sample preparation as described herein. As another example, 1 cc or 1.5 cc of sample can be deposited into a 2 cc sample vial. In some embodiments, because substantially all or all of the compounds of interest within a recognized GC-compatible range (e.g., all SVOCs) can be recovered from the sample using the techniques described herein, 1 cc of sample can achieve the same sensitivity during analysis as the sensitivity of 1 L of sample prepared using other solvent extraction techniques considering that the entire extract is injected during the GCMS analysis, whereas only 1 microliter of the final 1000 microliters of a liquid-liquid solvent extraction is injected, for reasons explained earlier. Therefore, much less sample is needed when performing the techniques disclosed herein to achieve equal sensitivity to other techniques, such as liquid-liquid extraction, and therefore much less sample needs to be collected and delivered to the laboratory in the first place when using the techniques disclosed herein compared to other techniques such as liquid-liquid extraction.

In some embodiments, sample 130 can be one of a wide array of samples that can be prepared using the systems and processes described herein. In some embodiments, the sample includes one or more compounds of interest, including volatile organic compounds (VOCs) and semi-volatile organic compounds (SVOCs). In some embodiments, the sample 130 includes a sample matrix (e.g., water, ethanol, etc.) that must be reduced or eliminated prior to analysis by GCMS. Thus, the sample extraction process described herein can be used to evaporate and remove the substantial volatile fraction of the sample matrix while collecting the compounds of interest in sorbent 102a-c, while further leaving non-volatile organic and inorganic matrix components in the sample container 120. In some embodiments, container 120 is a disposable, low cost vial, so remaining contaminants in the vial are disposed of and therefore have no chance of causing contamination in a future chemical analysis. Where possible, the use of certified clean vials for each new sample analysis can ensure long term stability and accuracy of analytical methodology.

In some embodiments, the system illustrated in FIGS. 1A-1C can be used to perform a Full Evaporative Vacuum Extraction (FEVE) sample preparation process, though the uses for the systems disclosed herein are not limited to FEVE. During the FEVE sample preparation process, a vacuum is drawn at port 106 to introduce a flow of the evaporated sample matrix from the sample vial 120 towards the bottom opening 108 of the sample extraction device, through conveyance 110, through sorbents 102a-c, through conveyance 104, and out through port 106. The flow of the evaporated sample matrix can act as a carrier fluid to introduce flow of one or more compounds of interest from the sample vial 120, to the bottom opening 108 of the sample extraction device 100, through conveyance 110, and into one of the sorbents 102a-c. Using the evaporating sample matrix as the carrier fluid to collect the compounds of interest can reduce of the volume of carrier fluid needed to extract the compounds of interest from the sample relative to other approaches that add a separate carrier gas to evaporate the volatile matrix components. In turn, using a smaller volume of carrier fluid can reduce the volume of sorbent 102a-c needed to retain the sample, thus improving recovery of the compounds during desorption and analysis, reducing the size/length of the extraction device, and improving the ability to clean up the sorbent (less sorbent cleans up faster than more sorbent).

The degree of vacuum and/or the temperature of the sample can be controlled to create a consistent volatilization of the sample matrix through the sorbent 102. A stronger vacuum or a slightly elevated temperature of the sample in the vial increases the evaporation rate, and therefore the rate of elimination of the aqueous or other solvent matrix through the sorbent. When applying an elevated temperature to the sample 130, the sorbents 102a-c must also be elevated in temperature to avoid condensation of the volatile matrix on the sorbent. A sorbent 102a-c temperature that is 5-20 degrees Celsius higher than the sample 130 should eliminate condensation within the sorbent 102a-c during elimination of the volatile matrix. In all cases, the combination of heat and vacuum should be maintained such that the volatile matrix of the sample 130 does not actively boil, as otherwise aerosols may transfer non-volatile matrix components into the sorbents 102a-c. Sorbents 102a-c include hydrophobic sorbents, such as Tenax or Carbopack or a combination of sorbents can be arranged in the tube from weakest to strongest (with the weakest sorbent 102a being closest to the sample vial 120 and the strongest sorbent 102c being furthest from the sample vial 120) to allow for recovery of a wider boiling point range of compounds, as described above. For example, glass beads coated with a thin layer of Polydimethylsiloxane rubber (0.1-5 um layer for example) can create a first, weak sorbent 102a to allow recovery of the heaviest compounds during thermal desorption without having to heat the sorbents 102a-c too high. Moreover, one or more relatively heavy compounds of the sample 130 can condense and remain on the inner surface of conveyance 110 of the sample extraction device 100 during the diffusive vacuum sampling process during which the temperature of the sample vial 120 is elevated and/or the vacuum is increased in some embodiments once the volatile matrix of the sample has been removed.

During volatilization of the matrix, compounds at the liquid/gas boundary layer are carried more efficiently into the gas phase than would be the case if there wasn't a gradient from higher to lower pressure created through continuous application of vacuum and the continuous evaporation of the matrix through the sorbent 102a-c. The rate of evaporation is optimized when the flow of gas phase matrix through the sorbent 102a-c is no more than 3-100 times the normal diffusion rate of sample compounds (and the volatile matrix) through the sorbent 102a-c. Operating the system to facilitate flow rates that are not too high above the diffusion rates reduces the amount of "channeling" around the sorbent 102a-c particles based on carrier gas-induced steering forces. In some embodiments, evaporation flow rates as slow as 1-2 cc of gas phase matrix per minute can allow 100 ul of liquid to be evaporated in under 20 minutes, while 1-3 cc of liquid can be evaporated in 2 to 16 hours. As an example, when using a sample extraction device 100 with a 4-5 mm inner diameter, the gas phase flow rate of the evaporating sample may be under 5 cc/min to reduce channeling. In some embodiments, a large number of (e.g., 30, 60, 90, etc.) samples can be processed during automated extractions, as will be described below with reference to FIG. 2, to increase laboratory throughput, so even 4 to 16-hour extractions can result in extremely high laboratory productivity when 30-90 samples are extracted simultaneously.

In some embodiments, after complete evaporation of the liquid matrix, the heaviest GC compatible compounds (e.g., 5-6 ring Polyaromatic Hydrocarbons, high boiling environmental pollutants, heavy phthalates and other plasticizers, etc.) may remain on the glass or residue in the vial 120. Thus, in some embodiments, prior to turning off the vacuum, the vials 120 can be heated to elevated temperatures using a heater, such as to a temperature in the range of 50 to 300 degrees Celsius, more than 250 degrees Celsius, or as high as 300 degrees Celsius or more. As an example, temperatures in the range of 200 to 250 degrees Celsius can allow recovery of 5-6 ring polycyclic aromatic hydrocarbons with boiling points in the range of 400 to 550 degrees Celsius at atmospheric pressure. In addition, increasing the vacuum after the volatile matrix has been removed can allow recovery of heavier target compounds at even lower temperatures, further reducing the potential for thermal degradation of the thermal labile compounds in the remaining residue in sample vial 120. Therefore, combining both heat and vacuum, with a very short distance between the sample 130 and the sorbents 102a-c allows recovery of compounds at much lower temperatures than would be needed at ambient pressures, thereby increasing the recovery of many thermally labile compounds. Heating to just 50-100 degrees Celsius when analyzing many natural products, such as wine, can recover all important aroma compounds without decomposing the sample matrix, thereby avoiding unwanted artifact compounds in the GCMS analysis. In addition, operating under a relatively strong vacuum in a second diffusive vacuum extraction step also removes the air and therefore oxygen that would otherwise cause reactions with food samples such as wine, even at relatively low temperature of 50-60 degrees Celsius, thereby allowing slightly higher temperatures to be applied (e.g., 50-100 degrees Celsius) with little to no artifact formation.

High temperature extractions would be problematic prior to elimination of the water or water/ethanol, as the rapid boiling and re-condensation of the hot water/alcohol on the sorbent 102a-c could rinse compounds off the sorbent 102a-c and back into the vial 120, for example. Moreover, allowing the sample 130 matrix to boil will aerosolize non-volatile matrix components such as salts (minerals), proteins, lipids, and the like, causing them to be deposited on the sorbents 102a-c, resulting in artifact formation during thermal desorption, damage to the sorbent, and shortening of the lifetime of the extraction device 100. In some embodiments, once the water/ethanol has all evaporated and passed through the sorbent, then the vials 106 can be heated to a higher temperature and/or the vacuum can be increased without the potential of boiling and condensing of the volatile matrix affecting compounds already adsorbed onto the sorbent 102. During heating, in some embodiments, the heavier GC compatible compounds that are still in the vial 120 can be given enough energy to volatilize off of the inner surface of the sample vial 120, or out of the remaining matrix residue, so they can be captured by sorbents 102a-c, or simply so they adhere to the inside of conveyance 110, allowing them to be easily recovered for chemical analysis (e.g., during thermal desorption into the GCMS).

The heating of the sample vial 120 during the second stage diffusive vacuum extraction process may have very little effect on the temperature of the sorbent 102a-c, as the top of the glass vial 120 can be a poor thermal conductor, and heating can be limited to a time period in the range of 1-10 minutes in some embodiments. In some embodiments, heating can be performed for a different amount of time. The heating temperature and duration can be dependent on the thermal stability of compounds remaining in the vial 120. As an example, the residue left when analyzing most water samples can be heated to 200-250 degrees Celsius without any degradation of the remaining residue, even in the presence of plastic nano-particles. After extraction, the vials can be cooled back down (e.g., to a temperature in the range 30 to 80 degrees Celsius or less), and the sample extraction devices 100 can be removed and isolated to prevent contamination while awaiting analysis by Thermal Desorption—Gas Chromatography/Mass Spectrometry (TD/GCMS), as described in more detail below with reference to FIG. 3.

Figure 2A:
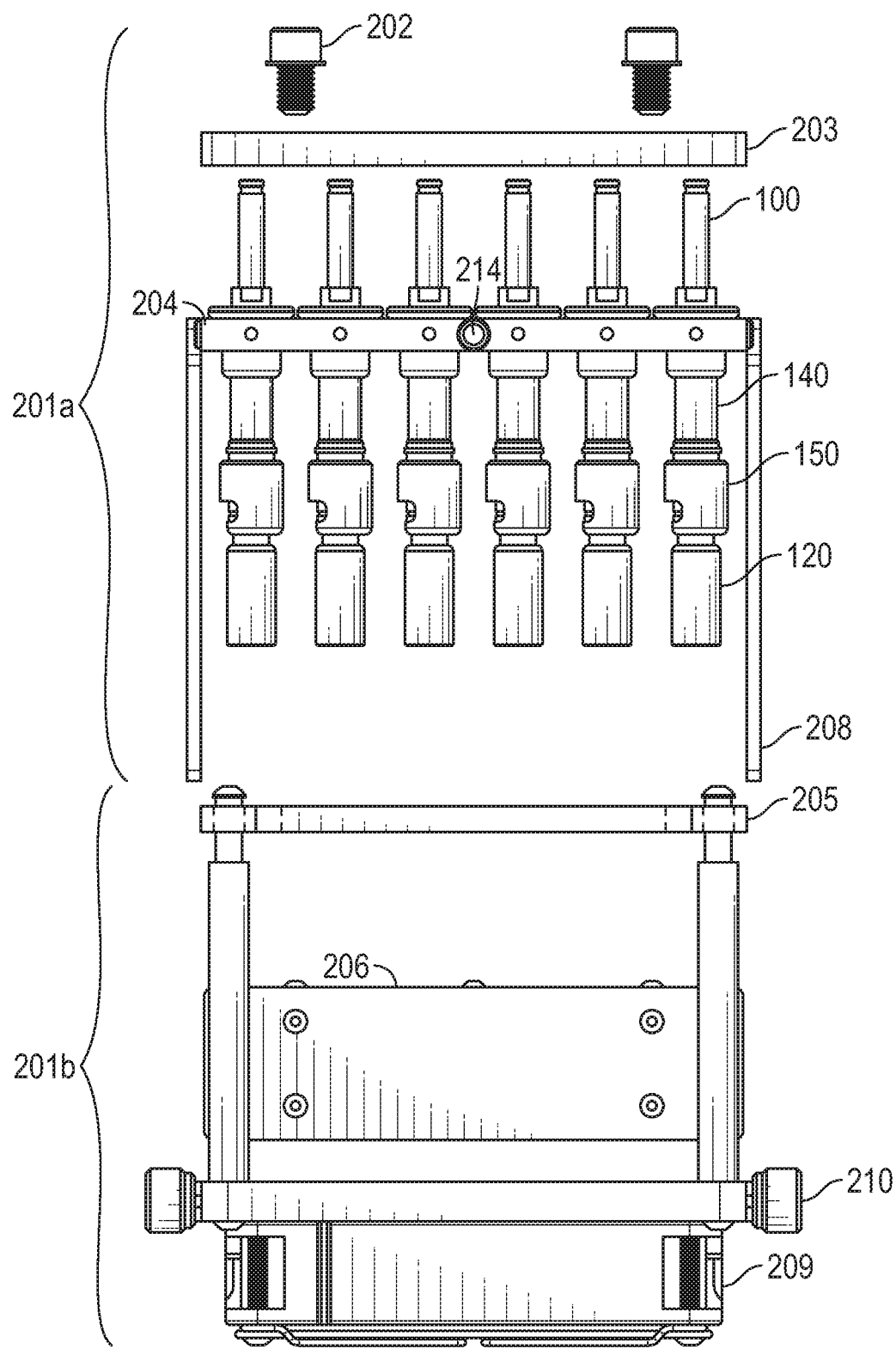
FIGS. 2A-2C illustrate multiple exemplary sample extraction systems in an automation configuration according to some embodiments.
Figure 2B:
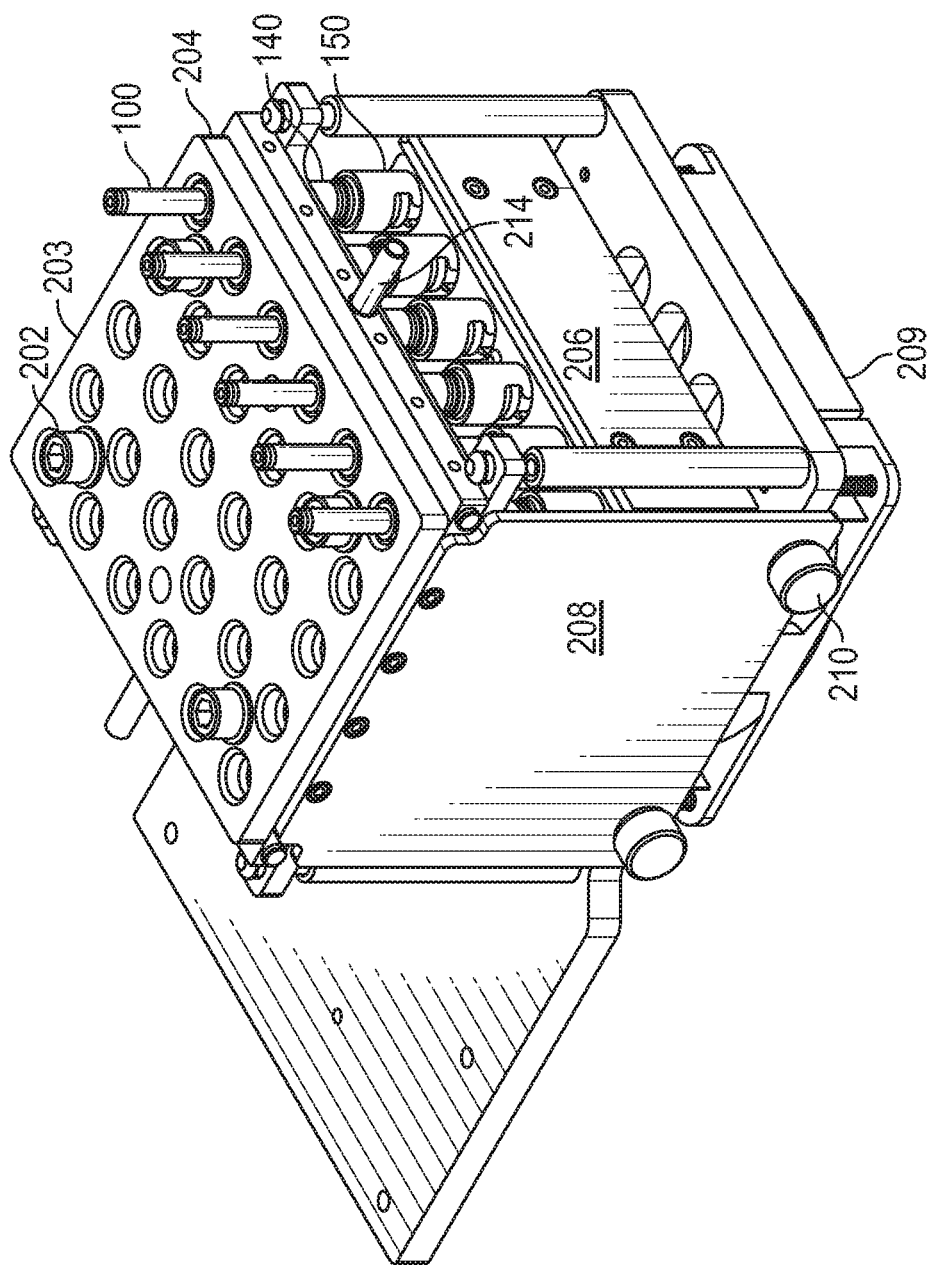
Figure 2C:
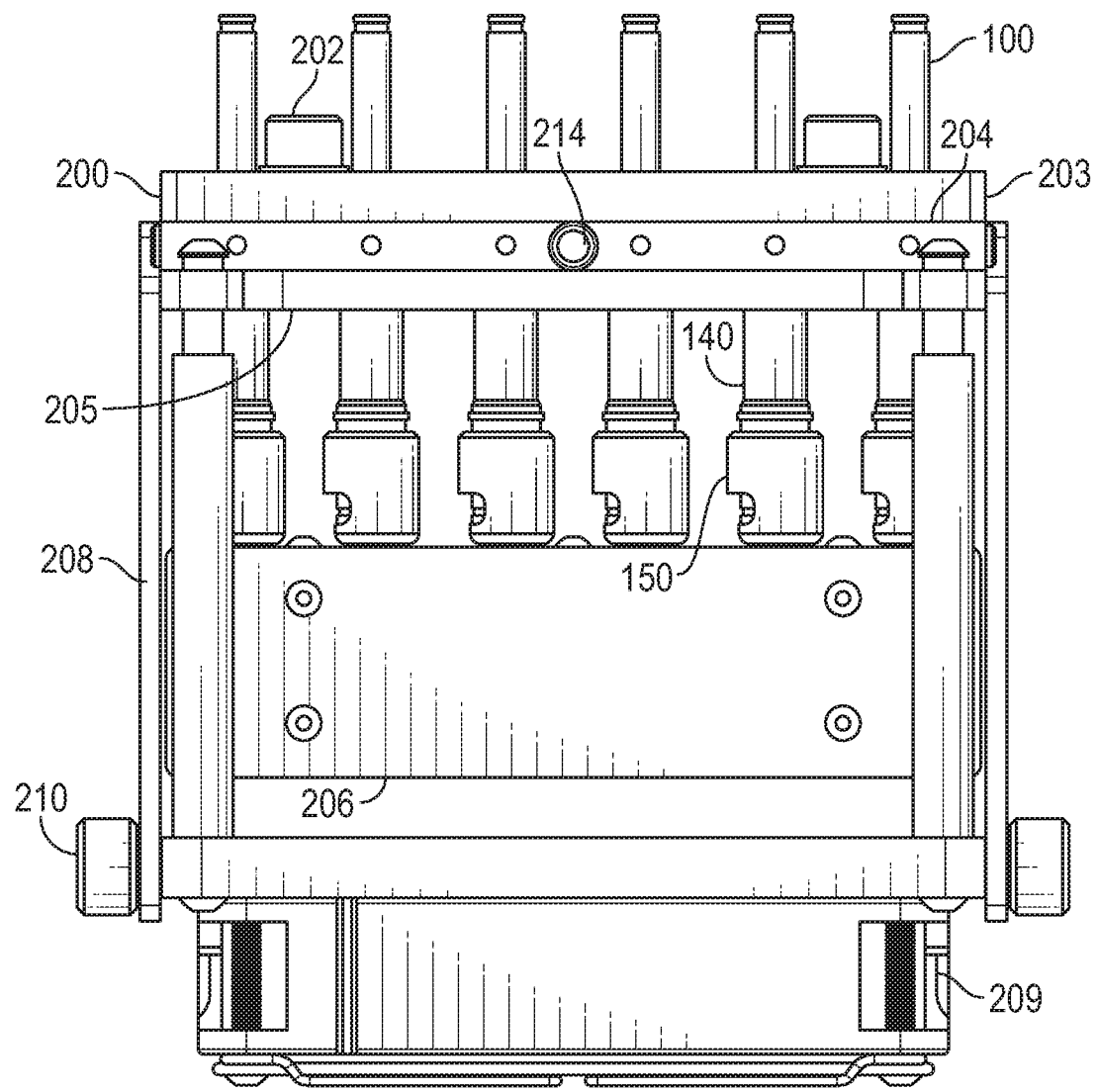

FIGS. 2A-2C illustrate multiple exemplary sample extraction systems 100 in an automation configuration according to some embodiments. In FIGS. 2A-2C, multiple sample extraction devices 100, each attached to a sample vial 120 as described above with reference to FIGS. 1A-1C, are held in a sample extraction module 200. In some embodiments, the sample extraction module 200 accommodates thirty sample extraction devices 100 (e.g., in five rows of six sample extraction devices 100). The sample extraction module 200 can include an extraction tray with a vacuum plate 204 including vacuum port 214 and side supports 208, a top clamping plate 203, bolts 202, vacuum plate heater 205, sample vial heater 206, and fasteners 210.

In some embodiments, the vacuum plate 204 can fluidly couple the ports 106 of sample extraction devices 100 through vacuum sleeves 140 to a vacuum source. The vacuum source can couple to the vacuum plate 204 via vacuum port 214. In this way, it is possible to draw a vacuum in all of the sample vials 120 simultaneously. Moreover, it can be easier for an automated system to deposit all of the sample extraction devices 100 (coupled to their respective sample vials 120, vacuum sleeves 140, and fasteners 150) and draw a vacuum with one source through vacuum plate 204 than it would be to couple a different vacuum source to each sample extraction device 100 assembly although separate connection of vacuum to each extraction device is certainly also possible in some embodiments. Additionally, drawing a vacuum in multiple sample extraction device 100 assemblies simultaneously can be more efficient than drawing a vacuum in the sample extraction devices 100 one at a time.

In some embodiments, the sorbents 102a-c can be selected for the sample such that the target compounds do not break through the sorbent 102a-c, preventing their loss to the vacuum pump. In some embodiments, if cross-contamination is a concern, removable filters and/or sorbents can be used between sample extraction devices 100. Bolts 202 can be tightened to push clamping plate 203 down onto the vacuum sleeves 140 to create a vacuum-tight seal to the vacuum plate 204 using seals 142a-b in order to maintain a controlled vacuum in sample vials 120 from the outside environment to ensure a vacuum can be drawn and maintained in the sample vials 120.

In some embodiments, the vacuum plate 204 can be coupled to a heater 205 to increase the rate of elimination of the volatile matrix through the vacuum plate 204 and out to the vacuum pump. Adding a heater 205 below the vacuum plate 204 can both heat the vacuum plate 204 and the lower part of the extraction device 100, to help maintain a sorbent 102a-c temperature that is 5-20 degrees Celsius above the temperature of the sample matrix. This heating can help to ensure that no condensation of the volatile matrix occurs in the extraction device 100 or within the vacuum plate 204, thereby reducing the time needed to perform the first stage dynamic extraction, which generally takes much longer than the diffusive, second stage (in situations in which the diffusive, second stage is performed).

In some embodiments, the sample vials 120 can be situated inside heater 206 during sample extraction. During evaporation of the sample matrix, the heater 206 can be heated to a temperature 40 degrees Celsius or less (e.g., 30 degrees Celsius). After the first stage dynamic vacuum extraction process where the removal of the volatilized matrix carried the compounds boiling from 100 to 400 degrees Celsius (for example) to the sorbent 102a-c and other compounds boiling below or substantially below 100 degrees Celsius pass through the sorbent, the vials 120 can be heated to higher temperatures once boiling of the remaining residue is no longer possible, so that remaining compounds can be diffusively transferred to the sorbent 102a-c, by depositing heavy compounds either on conveyance 110 or on the very front of the first sorbent 102a, improving their final recovery and eventual cleanup from the sorbent extraction device 100 thereby reducing the potential for carryover into subsequent analyses. For some samples, heating the sample with heater 206 can volatilize the heavier compounds of interest, allowing these heavier compounds of interest to reach the sorbent 102a-c of sample extraction device 100 to be collected and analyzed.

In some embodiments, vacuum sleeves 140, vacuum plate 204, vacuum clamping plate 203, bolts 202 and vertical supports 208 (in total, the FEVE Tray 201a) create a fast way to transfer the assembled tray 200 containing the extraction devices 100 to the FEVE heater platform 201b containing the upper heater 205 and lower heater 206, so that the heaters do not have to be unplugged and moved along with the trays. This way, when one tray of 30 samples is being extracted, another tray can be loaded with sample vials 120, extraction devices 100, and vacuum sleeves 140 to start the extraction when the previous tray has finished. This arrangement can allow for higher throughput in production laboratories.

In some embodiments, the automation configuration illustrated in FIG. 2 can be used to perform a 4 to 16-hour extraction on 30 or more samples at the same time, which can be the same amount of time it would take to process thirty samples through a GCMS if a complete cycle time, injection to injection, takes 30 minutes. A standard GCMS cycle time can be on the order of 25-45 minutes per analysis of organics in water (30 samples run every 15 to 25 hours), so a 16 hour overnight extraction of 30 samples can be an acceptable throughput rate. For example, while thirty samples are being prepared, the 30 previously-prepared samples can be analyzed via GCMS. For faster GCMS methods, more than 30 samples can be extracted at a time, to accommodate even higher throughput rates, such as extracting 2, 3, or 4 trays at a time. These extraction can occur at the GCMS location, or remote, in another area of the laboratory, or in a remote location, with only the extraction devices shipped to the laboratory, not the original, pre-extraction samples themselves. In some embodiments, depending on the sample to be prepared, extraction of 30 sample can take less than 16 hours (e.g., 4 hours).

In some embodiments, a vacuum can be maintained/created by fluidly coupling a vacuum source to the ports 106 of the sample extraction devices 100. In some embodiments, during analysis (e.g., via GCMS), the ports 106 are used to perform thermal desorption of the sample into a GCMS. If these sealing devices are connected to each other, such as in a plate 204 with vacuum containing channels on a tray, the numerous extraction devices 100 can be coupled to the same vacuum source distributed through this plate 204 to the side port 106 on each sample extraction device 100. When the matrix in each sample vial 120 is completely exhausted, higher vacuum levels (e.g., lower pressures) will be achieved, especially when evacuating through a slight resistance (e.g., the sorbent 102a-c). In some embodiments, a vacuum sensor can "sense" when all the matrix is gone from all of the vials by sensing the increased level of vacuum (e.g., lower pressure) pulled in the sample vials 120. For example, while matrix remains in the sample vials 120, a pressure of 0.3 to 0.4 psia can be achieved for primarily water-based samples at 30 degrees Celsius and once the matrix is fully evaporated, a pressure of 0.1 to 0.2 psia can be achieved whether the original sample contained primarily water, water/alcohol, water/solvent, or primarily solvent matrix. When a substantial amount of lower boiling point solvents are used or added to the matrix, such as during extraction from vegetables, fruits, or other foods, the optimum vacuum for extraction may be higher (0.5-2 psia, for example) such that boiling will not occur in the vial. In some embodiments, in response to detecting the pressure reduction, the sample vials 120 can be heated slightly using heater 206, for example (e.g., from a temperature of about 30 degrees Celsius to a temperature about 40 degrees Celsius). If the pressure increases in response to a slight increase in the sample vial 120 temperatures, the dynamic removal of water or solvent has not yet finished, and should be allowed to continue until a vacuum below the vapor pressure of the water, solvent, or mixture thereof can be maintained.

When arranged in larger numbers, such as in FIG. 2, an autosampler can remove the sample extraction devices 100 after the extraction process is complete. In some embodiments, the autosampler can grab the extraction devices 100 by detents 114 of the sample extraction devices 100. In some embodiments, when the autosampler breaks the seal by lifting the sample extraction devices 100 out of the vacuum sleeve 140, retaining screws 210 ensure that the entire tray cannot be lifted up, but rather only the individual extraction devices 100. After extraction, in some embodiments, the autosampler can place the sample extraction devices 100 in isolated, protective sleeves until analysis. In some embodiments, the sample compounds collected in the sorbents 102a-c of sample extraction devices 100 can be analyzed using system 300, which will now be described with reference to FIG. 3.

Figure 3:
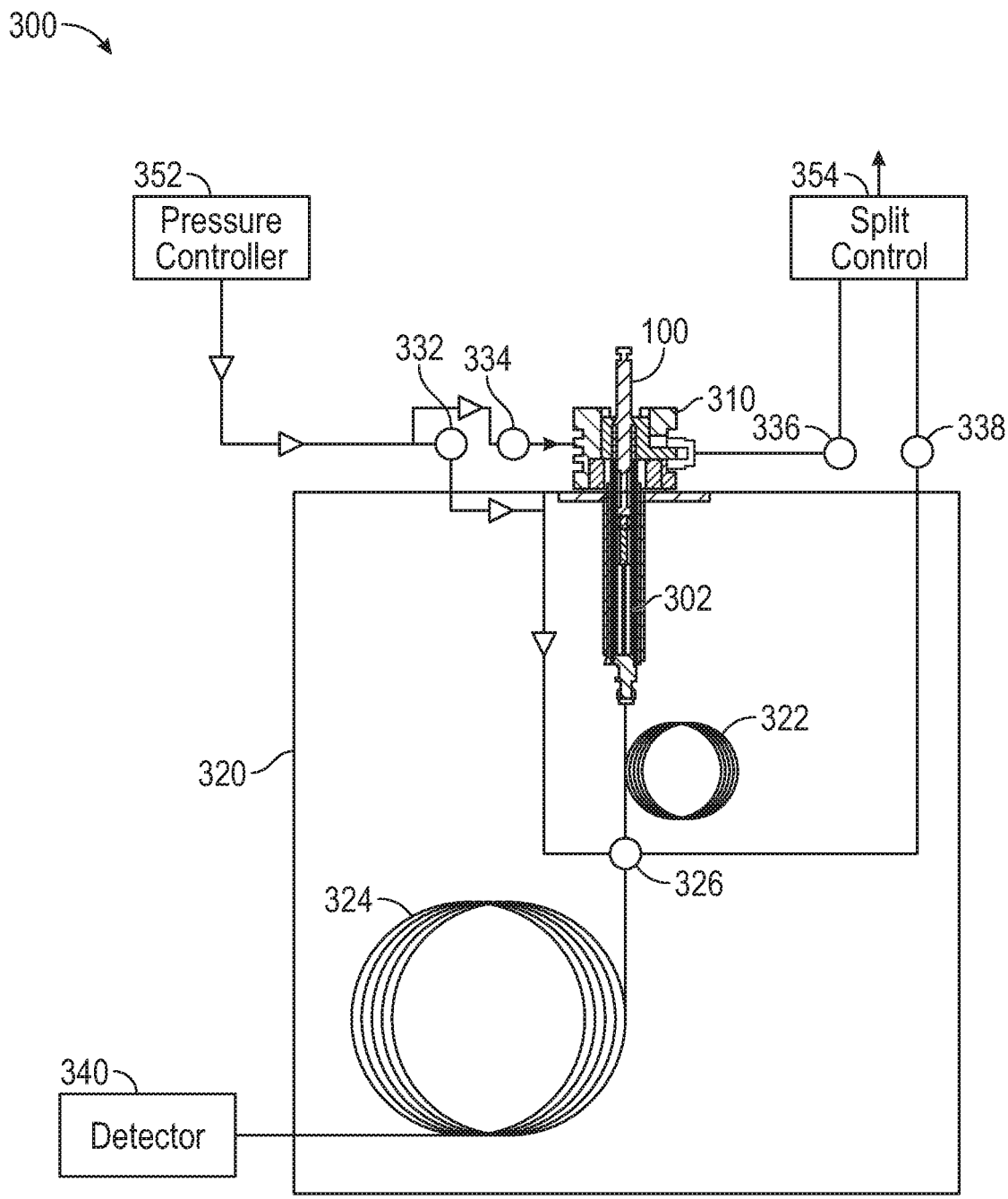
FIG. 3 illustrates the system used to analyze the sample collected in the sample extraction device according to some embodiments of the disclosure.

FIG. 3 illustrates the system 300 used to analyze the sample collected in the sample extraction device 100 according to some embodiments of the disclosure. The system 300 includes a thermal desorption device 310, a gas chromatograph 320, a plurality of valves 332-338, detector 340, pressure controller 352 and flow controller 354. The gas chromatograph 320 houses a pre-column 322 and a separation column 324. Pressure controller 352 controls the flow rate of carrier fluid through desorption valve 334 to the sample extraction device 100 and/or the flow rate of carrier fluid through bypass valve 332 to column 324. Split control 354 controls the flow rate from the sample extraction device 100 through split valve 336 and/or from junction 326 through split valve 338 out of the system 300.

Bypass valve 332 couples the carrier fluid to a junction 326 between the pre-column 322 and separation column 324. Desorption valve 334 couples the carrier fluid source to the sample extraction device 100. Split valve 336 couples the sample extraction device 100 to split controller 354, allowing compounds to exit the system before pre-column 322. Split valve 338 couples the junction 326 between the pre-column 322 and separation column 324 to split controller 354, allowing compounds that traversed the pre-column 322 to exit the system before entering column 324.

The thermal desorption device 310 is attached on top of the gas chromatograph (GC) 320 to allow the sample to be introduced directly into the GC 320. This arrangement improves recovery of the sample relative to systems that desorb the sample into a remote "conditioning" device that must then deliver the sample through rotary valves and an additional heated line to the GC. The thermal desorption device 310 only exposes the sample to the thermal desorption device liner 302 disposed inside of the thermal desorption device 310, and the pre-column 322 that can be used to further concentrate the sample after desorption. Therefore, replacement of liner 302 and pre-column 322 provides a completely new flow path for system 300, providing a solution that can continue to provide the same performance indefinitely simply by occasionally replacing these two components.

During desorption, the thermal desorption device 310 is heated to a desorption temperature in the range of 200-350 degrees Celsius. This heat causes the compounds trapped in sample extraction device 100 to be released by the sorbents 102a-c of the sample extraction device 100. During desorption, split port 338 downstream of the pre-column is opened to increase the flow rate through the sample extraction device 100 to improve recovery rates of heavier compounds. During desorption, heavy VOCs and all SVOCs are collected on the pre-column 322, with water vapor and lighter compounds being mostly split out between pre-column 322 and separation column 324 via split port 338. In a second mode of operation when trace level analysis is not needed, a non-retentive pre-column 322 is used, and the split valve 338 is kept on until all compounds of interest have been split equally out through valve 338, allowing very reproducible results.

After desorption is complete, split port 336 is opened to substantially stop any residual compounds left in the sample extraction device 100 from reaching the pre-column 322, and split port 338 can be closed. In this way, the complete contents of the pre-column 322 are transferred to column 324 (during trace level analysis) as the temperature of GC 320 is ramped to higher temperatures, thereby maximizing the sensitivity of the technique. Later, in some embodiments, bypass valve 332 is opened to enable the flow of carrier fluid through column 324 without flowing through pre-column 322. In yet other embodiments, by opening bypass valve 332 and then opening split valve 336, the pre-column can be backflushed to remove the very heaviest compounds to avoid contamination of the primary analytical column 324. Due to the temperature and flow consistency of today's GC analyzers, this backflush point in the analysis can be very reproducible to ensure all target compounds are recovered, while still optimizing sample throughput as the very heaviest compounds can be backflushed off the pre-column 322 much faster than they can be pushed through the entire length of the main column 324. Compounds eluting from the column 324 are introduced to detector 340. Detector can be a non-specific detector, such as an FID, PID, ECD, FPD, PFPD, PDD, Hall Detector, CLD, or others or a Mass Spectrometer, such as single quadrupole, triple quadruple (QQQ), Time of Flight, Ion Trap, FTMS, or Orbitrap designs.

Figure 4:
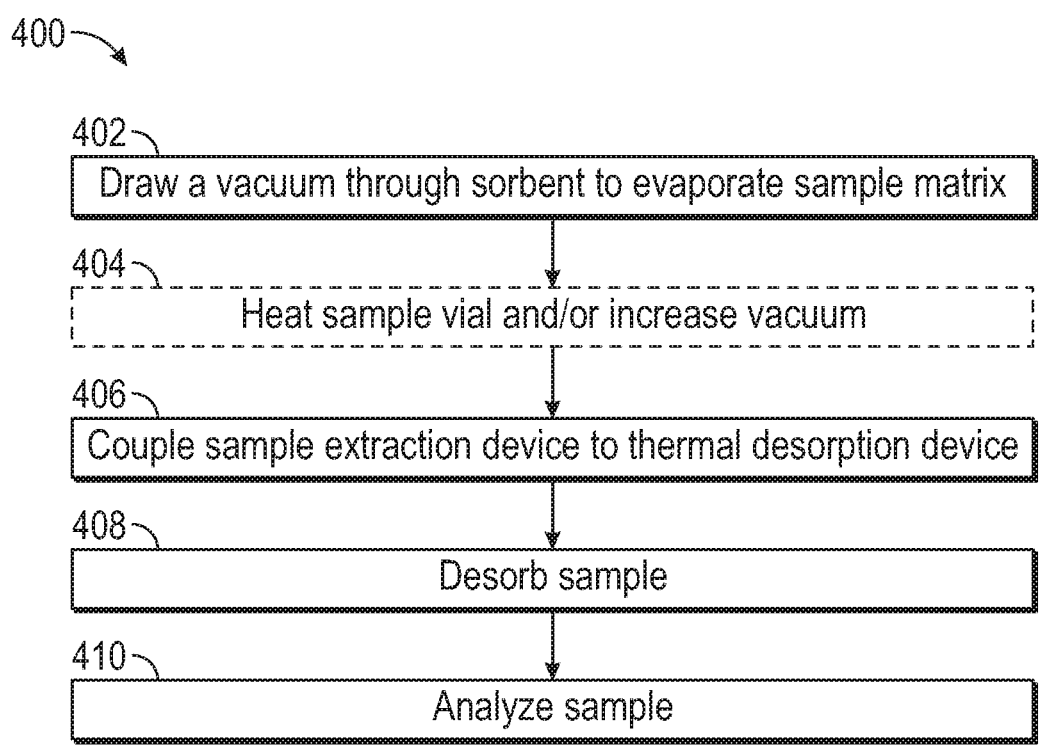
FIG. 4 illustrates an exemplary method of preparing and analyzing a sample according to some embodiments of the disclosure.

FIG. 4 illustrates an exemplary method 400 of preparing and analyzing a sample according to some embodiments of the disclosure. Method 400 can be performed using one or more of the systems described above with reference to FIGS. 1A-3. Prior to performing method 400, a sample 130 is measured into a sample vial 120, which can then be attached to a sample extraction device 100 as shown in FIG. 1A-1B or FIG. 2. One or more steps of method 400 can be repeated or skipped and the steps of method 400 may be performed in an order other than the order described herein. In some embodiments, one or more steps of method 400 can be automated. Thus, instructions for executing method 400 may be stored on a non-transitory computer readable storage medium that can be read by an electronic device to perform method 400.

In step 402 of method 400, a vacuum can be drawn in the sample vials 120 through sorbents 102a-c. For example, as described above with reference to FIG. 2, a vacuum can be drawn in multiple sample vials 120 disposed in vacuum tray 200. Step 402 is performed until all of the highly volatile matrix of the sample 130 has been evaporated. Moreover, the flow of the evaporating sample matrix acts as a carrier fluid to carry one or more compounds of interest to the sorbents 102a-c within the sample extraction devices 100. As described herein, trapping one or more compounds of interest while the vacuum is being drawn and the sample matrix is evaporating is a dynamic headspace process. During step 402, the temperature of heater 206 can be 40 degrees Celsius or less. Performing step 402 at a lower temperature than the temperature used during step 404 (if performed) reduces or prevents reaction of many compounds with water, including compounds that are subject to hydrolysis in hot water (e.g., pesticides, herbicides, chemical warfare agents). The completion of step 402 can be determined by using a pressure sensor/transducer that shows a drop in the pressure when all of the highly volatile matrix has been evaporated. In some embodiments, after the pressure sensor detects a drop in the pressure, the temperature of the sample vial 120 can be raised slightly while monitoring the pressure sensor to verify that the pressure does not increase, indicating that the volatile matrix has been completely removed.

In some embodiments, in step 404 of method 400, the sample vials 120 can be heated and/or the vacuum can be increased, considering the volatile matrix has already been removed. For example, as described above with reference to FIG. 2, the sample vials 120 can be heated using heater 206 to a temperature in the range of 50 to 300 degrees Celsius, 50 to 100 degrees Celsius, 200 to 250 degrees Celsius, more than 300 degrees Celsius, or another suitable temperature. In some embodiments, the sample vial 120 is heated for a period of time in the range of 5 to 10 minutes, for example. In some embodiments, step 404 is performed once all of the sample matrix has been evaporated (e.g., during step 402). Heating the sample vial 120 in this way can volatilize one or more heavier compounds of interest of the sample that were not transferred to the sorbent 102a-c during step 402. In some embodiments, the heat applied in step 404 can be selected to volatilize the heavy compounds without creating artifacts by breaking the compounds down. In some embodiments, trapping one or more compounds of interest while the vacuum is held in the sample vial and the sample vial is heated is a diffusive process.

After step 402 and/or 404, the sample extraction device can be placed in an isolation sleeve until analysis. If step 404 was performed, the sample extraction devices 100 can be allowed to cool (e.g., to a temperature in the range of 25 to 80 degrees Celsius, 25 to 50 degrees Celsius, or another suitable temperature). In some embodiments, before decoupling the vacuum source from the sample extraction devices 100, the vacuum can be turned off and Nitrogen gas or another inert gas can be used to pressurize the sample extraction devices 100 to reduce or prevent contamination from the air in the environment of the system. The Nitrogen or other gas can be introduced to the sample extraction devices 100 through port 106. In some embodiments, a sample extraction device 100 can be directly transferred from the vacuum tray 200 to the chemical analysis system 300. However, in some embodiments, multiple samples can be extracted in steps 402 and/or 404 (e.g., as described above with reference to FIG. 2) and one or more samples can be stored in isolation sleeves while the other samples are processed. Isolating the sample extraction devices 100 reduces or prevents contamination of the extracted sample held within the sorbent 102a-c of the sample extraction devices 100.

In some embodiments, in step 408 of process 400, the sample can be desorbed from the sample extraction device 100 using system 300 described above with reference to FIG. 3. During step 408, the sample extraction device 100 can be disposed within thermal desorption device 310. Thermal desorption can cause one or more sample compounds retained by the sorbent 102a-c to desorb from the sorbent 102a-c to enter the pre-column in the GC 320 for further separation from remaining light compounds, including any air and water vapor.

In some embodiments, in step 410 of process 400, the sample can be analyzed, such as by separation on analytical column 324 and by using a detector 340 described above with reference to FIG. 3. In some embodiments, after performing the chemical analysis using column 324 and detector 340, the chemical analysis system 300 can be baked out to remove any compounds before the next sample is analyzed.

In some embodiments, the disclosed systems and methods can extract and analyze volatile and semi-volatile compounds in liquid and solid samples by GCMS. In some embodiments, the target compounds of the sample can have boiling points in the range of 100 to 600 degrees Celsius. For example, the system can be used for environmental analysis of water and soil samples for organic contaminants including herbicides, pesticides, fungicides, VOCs, SVOCs, PAHs, PCBs, Phthalates, PFOA/PFOS, pharmaceuticals, and other contaminants, the analysis of clinical samples including blood, urine, and breath condensate for detection and quantitation of illicit drugs as well as disease markers, analysis of flavors, fragrances, and contaminants (e.g., pesticides, herbicides, etc.) in foods and beverages, measurement of cosmetics and a variety of consumer products, detection of nerve agents at trace levels, analysis of sea water for trace components, and a variety of forensic measurements.

For example, the pesticide contents of produce (e.g., fruits, vegetables) and/or other foods can be analyzed using the techniques disclosed herein. In this example, the produce can be blended and exposed to a solvent, such as water and Ethanol, or some other solvent to ensure the solubilizing of triglycerides and other organic materials including pesticides and other pollutants into the solvent or water/solvent mixture. In this example, the produce and solvent blend can be centrifuged to separate the cellulose from the solvent containing the compounds of interest, and a portion of the solvent layer can be pipetted into one or more sample vials 120 described above. In this example, the solvent can be evaporated in a manner similar to the manner described above with respect to evaporating the matrix of a sample. The evaporation of solvent can carry one or more compounds of interest to the sorbents 102a-c, while one or more triglycerides and non-volatile compounds can remain in the sample vial 120. In this example, once the solvent is completely evaporated, the sample vial 120 and remaining compounds can be heated to volatilize the GC-compatible compounds of interest, including one or more pesticides, while the non-GC compatible compounds remain in the sample vial 120. In addition, the vacuum level can be increased to lower the required temperatures needed to recover the heavier pesticides or other compounds of interest. Thus, in this example, the techniques described herein can be used to completely extract the compounds of interest from the sample, remove the solvent via evaporation, and avoid injecting the non-GC compatible compounds into the gas chromatograph by leaving those compounds in the sample vial 120 after extraction of the compounds of interest. As with other analytical methods, surrogate or recovery compounds can be added to the initial sample prior to blending to ensure a consistent recovery during the extraction process. The techniques described herein are able to do all this without being limited to the 1 microliter volume of solvent that can typically be injected into a standard GC injector. Instead, 1000-2000 microliters can be analyzed, with virtually all of the compounds of interest in that volume of solvent being injected into the GCMS, substantially increasing the sensitively relative to direct GC solvent injection.

Some embodiments are directed to a method comprising coupling a sample extraction device including a sorbent to a sample vial via a coupling that does not include a transfer line, the sample vial including a sample that includes a sample matrix and one or more target compounds; pulling, with a vacuum source, a vacuum through the sorbent and the sample vial; and while pulling the vacuum with the vacuum source: retaining the one or more target compounds using the sorbent; evaporating and removing one or more other compounds of the sample from the system. In some embodiments, pulling the vacuum through the sorbent and the sample vial, retaining the one or more target compounds using the sorbent, and evaporating and removing the one or more other compounds of the sample from the system occurs during a dynamic vacuum extraction process. In some embodiments, the one or more other compounds of the sample are completely removed from the system. In some embodiments, the method further includes, after evaporating and removing the one or more other compounds of the sample from the system, performing one or more of heating the sample vial to a temperature in the range of 50 to 350 degrees Celsius or increasing the vacuum in the sample vial. In some embodiments, the method further includes while performing one or more of increasing the vacuum in the sample vial or heating the sample vial to the temperature in the range of 50 to 350 degrees Celsius: collecting one or more second target compounds not collected while evaporating and removing the one or more other compounds of the sample from the system in a diffusive vacuum extraction process. In some embodiments, pulling the vacuum through the sorbent and the sample vial, retaining the one or more target compounds using the sorbent, and evaporating and removing the one or more other compounds of the sample from the system occurs while the sample vial is at a temperature 40 degrees Celsius or less. In some embodiments, the vacuum source concurrently pulls the vacuum through a plurality of sorbents, each sorbent included in one of in a plurality of sample vials. In some embodiments, the method further includes thermally separating the sorbent and the sample vial using a lower conveyance of the sample extraction device that is disposed between the sorbent and a lower opening of the sample extraction device. In some embodiments, the method further includes after evaporating and removing the one or more other compounds of the sample from the system, collecting one or more second target compounds of the sample in the lower conveyance of the sample extraction device during a diffusive vacuum extraction process. In some embodiments, the method further includes sensing, using a vacuum sensor, the pressure in the sample vial; and determining that the one or more other compounds of the sample have been completely removed from the system based on determining that the pressure in the sample vial is less than a predetermined threshold.

Some embodiments are directed to a system comprising a sample extraction device including a sorbent; a coupling that does not include a transfer line, the coupling configured to couple the sample extraction device to a sample vial including a sample that includes one or more target compounds and one or more other compounds; a vacuum source configured to: pull a vacuum through the sorbent and the sample vial; and evaporate and remove the one or more other compounds of the sample from the system, wherein the sorbent is configured to retain the one or more target compounds while the vacuum source pulls the vacuum through the sorbent and sample vial. In some embodiments, pulling the vacuum through the sorbent and the sample vial, retaining the one or more target compounds using the sorbent, and evaporating and removing the one or more other compounds of the sample from the system occurs during a dynamic vacuum extraction process. In some embodiments, the one or more other compounds of the sample are completely removed from the system. In some embodiments, the system further includes comprising a heater configured to heat the sample vial, wherein, the system is configured to, after evaporating and removing the one or more other compounds of the sample from the system, perform one or more of heating, with the heater, the sample vial to a temperature in the range of 50 to 350 degrees Celsius or increasing the vacuum in the sample vial using the vacuum source. In some embodiments, one or more second target compounds not collected while evaporating and removing the one or more other compounds of the sample from the system in a dynamic vacuum process are collected while performing one or more of increasing the vacuum in the sample vial or heating the sample vial to the temperature in the range of 50 to 350 degrees Celsius. In some embodiments, pulling the vacuum through the sorbent and the sample vial, retaining the one or more target compounds using the sorbent, and evaporating and removing the one or more other compounds of the sample from the system occurs while the sample vial is at a temperature 40 degrees Celsius or less. In some embodiments, the vacuum source is configured to concurrently pull the vacuum through a plurality of sorbents, each sorbent included one of in a plurality of sample vials. In some embodiments, a lower conveyance disposed between the sorbent and a lower opening of the sample extraction device, wherein the lower conveyance is configured to provide thermal separation between the sample vial and the sorbent. In some embodiments, the lower conveyance is further configured to, during a diffusive vacuum extraction process, collect one or more second target compounds of the sample after the one or more other compounds are evaporated and removed from the system. In some embodiments, the system further includes a vacuum sensor configured to sense the pressure in the sample vial, wherein it is determined that the one or more other compounds of the sample have been completely removed from the system based on determining that the pressure in the sample vial is less than a predetermined threshold.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A method comprising:
   coupling a sample extraction device including a sorbent to a sample vial via a coupling that does not include a transfer line, the sample vial including a sample that includes a sample matrix and one or more target compounds;
   thermally separating the sorbent and the sample vial using a lower conveyance of the sample extraction device that is disposed between the sorbent and a lower opening of the sample extraction device;
   pulling, with a vacuum source, a vacuum through the sorbent and the sample vial;
   while pulling the vacuum with the vacuum source:
      retaining the one or more target compounds using the sorbent; and
      evaporating and removing one or more other compounds of the sample from the system; and
   after evaporating and removing the one or more other compounds of the sample from the system, collecting one or more second target compounds of the sample in the lower conveyance of the sample extraction device during a diffusive vacuum extraction process.

2. The method of claim 1, wherein pulling the vacuum through the sorbent and the sample vial, retaining the one or more target compounds using the sorbent, and evaporating and removing the one or more other compounds of the sample from the system occurs during a dynamic vacuum extraction process.

3. The method of claim 1, wherein the one or more other compounds of the sample are completely removed from the system.

4. The method of claim 1, further comprising:
   after evaporating and removing the one or more other compounds of the sample from the system, performing one or more of heating the sample vial to a temperature in the range of 50 to 350 degrees Celsius or increasing the vacuum in the sample vial.

5. The method of claim 4, further comprising:
   while performing one or more of increasing the vacuum in the sample vial or heating the sample vial to the temperature in the range of 50 to 350 degrees Celsius:
      collecting one or more second target compounds not collected while evaporating and removing the one or more other compounds of the sample from the system in a diffusive vacuum extraction process.

6. The method of claim 1, wherein pulling the vacuum through the sorbent and the sample vial, retaining the one or more target compounds using the sorbent, and evaporating and removing the one or more other compounds of the sample from the system occurs while the sample vial is at a temperature 40 degrees Celsius or less.

7. The method of claim 1, wherein the vacuum source concurrently pulls the vacuum through a plurality of sorbents, each sorbent included in one of in a plurality of sample vials.

8. The method of claim 1, further comprising:
   sensing, using a vacuum sensor, the pressure in the sample vial; and
   determining that the one or more other compounds of the sample have been completely removed from the system based on determining that the pressure in the sample vial is less than a predetermined threshold.

9. A system comprising:
   a sample extraction device including a sorbent;
   a coupling that does not include a transfer line, the coupling configured to couple the sample extraction device to a sample vial including a sample that includes one or more target compounds and one or more other compounds;
   a lower conveyance disposed between the sorbent and a lower opening of the sample extraction device, wherein the lower conveyance is configured to:
      provide thermal separation between the sample vial and the sorbent, and
      during a diffusive vacuum extraction process, collect one or more second target compounds of the sample after the one or more other compounds are evaporated and removed from the system; and
   a vacuum source configured to:
      pull a vacuum through the sorbent and the sample vial; and
      evaporate and remove the one or more other compounds of the sample from the system, wherein the sorbent is configured to retain the one or more target compounds while the vacuum source pulls the vacuum through the sorbent and sample vial.

10. The system of claim 9, wherein pulling the vacuum through the sorbent and the sample vial, retaining the one or more target compounds using the sorbent, and evaporating and removing the one or more other compounds of the sample from the system occurs during a dynamic vacuum extraction process.

11. The system of claim 9, wherein the one or more other compounds of the sample are completely removed from the system.

12. The system of claim 9, further comprising a heater configured to heat the sample vial, wherein, the system is configured to, after evaporating and removing the one or more other compounds of the sample from the system, perform one or more of heating, with the heater, the sample vial to a temperature in the range of 50 to 350 degrees Celsius or increasing the vacuum in the sample vial using the vacuum source.

13. The system of claim 12, wherein: one or more second target compounds not collected while evaporating and removing the one or more other compounds of the sample from the system in a dynamic vacuum process are collected while performing one or more of increasing the vacuum in the sample vial or heating the sample vial to the temperature in the range of 50 to 350 degrees Celsius.

14. The system of claim 9, wherein pulling the vacuum through the sorbent and the sample vial, retaining the one or more target compounds using the sorbent, and evaporating and removing the one or more other compounds of the sample from the system occurs while the sample vial is at a temperature 40 degrees Celsius or less.

15. The system of claim 9, wherein the vacuum source is configured to concurrently pull the vacuum through a plurality of sorbents, each sorbent included one of in a plurality of sample vials.

16. The system of claim 1, further comprising:
a vacuum sensor configured to sense the pressure in the sample vial, wherein it is determined that the one or more other compounds of the sample have been completely removed from the system based on determining that the pressure in the sample vial is less than a predetermined threshold.

* * * * *